United States Patent [19]

Westman

[11] Patent Number: 4,647,072
[45] Date of Patent: Mar. 3, 1987

[54] REPAIR SLEEVE FOR PIPING

[76] Inventor: Stig Westman, Räfsvägen 22, S-740 40 Heby, Sweden

[21] Appl. No.: 716,468

[22] Filed: Mar. 27, 1985

[30] Foreign Application Priority Data

Mar. 30, 1984 [SE] Sweden .................................. 8401781
Jun. 20, 1984 [SE] Sweden .................................. 8403320

[51] Int. Cl.⁴ ............................................. F16L 55/18
[52] U.S. Cl. ......................................... 285/15; 285/23; 285/397; 285/370; 29/255; 29/451; 138/97; 138/DIG. 5; 267/1.5; 267/166
[58] Field of Search ......................... 285/15, 16, 17, 23, 285/318, 397, 387.4, 258, 244, 381, 370; 138/97, 98, DIG. 5; 267/1.5 X, 166 X; 29/456, 450, 451, 234, 235, 255, 257; 254/10.5

[56] References Cited

U.S. PATENT DOCUMENTS

| | | | |
|---|---|---|---|
| 2,156,604 | 5/1939 | Payne et al. | 285/285 |
| 2,184,634 | 12/1939 | Crickmer et al. | 138/89 |
| 2,977,994 | 4/1961 | Xenis | 285/370 |
| 3,034,869 | 5/1962 | Peterson | 267/180 |
| 3,243,211 | 3/1966 | Wetmore | 138/178 |
| 3,270,817 | 9/1966 | Papaila | 29/227 |
| 3,336,842 | 8/1967 | Adelt | 267/180 |
| 3,474,832 | 10/1969 | Broadhead | 138/97 |
| 3,895,652 | 7/1975 | Zach | 29/451 |
| 4,109,684 | 7/1978 | Fernandez | 138/97 |
| 4,330,916 | 5/1982 | Dannatt | 29/227 |

FOREIGN PATENT DOCUMENTS

| | | | |
|---|---|---|---|
| 2333768 | 2/1974 | Fed. Rep. of Germany | 285/258 |
| 3236020 | 5/1983 | Fed. Rep. of Germany | 29/225 |
| 541022 | 12/1976 | U.S.S.R. | 285/23 |
| 885685 | 11/1981 | U.S.S.R. | 138/97 |

Primary Examiner—Richard J. Scanlan, Jr.
Assistant Examiner—Eric K. Nicholson
Attorney, Agent, or Firm—Witherspoon & Hargest

[57] ABSTRACT

The present invention relates to a repair sleeve comprising a flexible, hose-like main part (1) and a spiral spring (2), which, when the sleeve is mounted in a pipe line, pretensions the hose-like main part (1) into sealing engagement against the inner wall of the surrounding pipe. The invention also includes an insertion device (4) for the repair sleeve, said device being a cylindrical body (5) mounted on wheels. At the ends of this body (5) there are latching means (7, 8) which are releasably fastenable to the ends of the spring (2). The latching means comprise a pin (7) biased to thrust out through the wall of the body (5) and into holes at the ends of the spring (2) wound round the body (5). Both pins (7) are simultaneously releasable with the aid of a linkage system (11, 13, 14, 15) on actuating the system. Eyes or cages (8) accommodating the ends of the springs are also associated with the pins (7).

13 Claims, 8 Drawing Figures

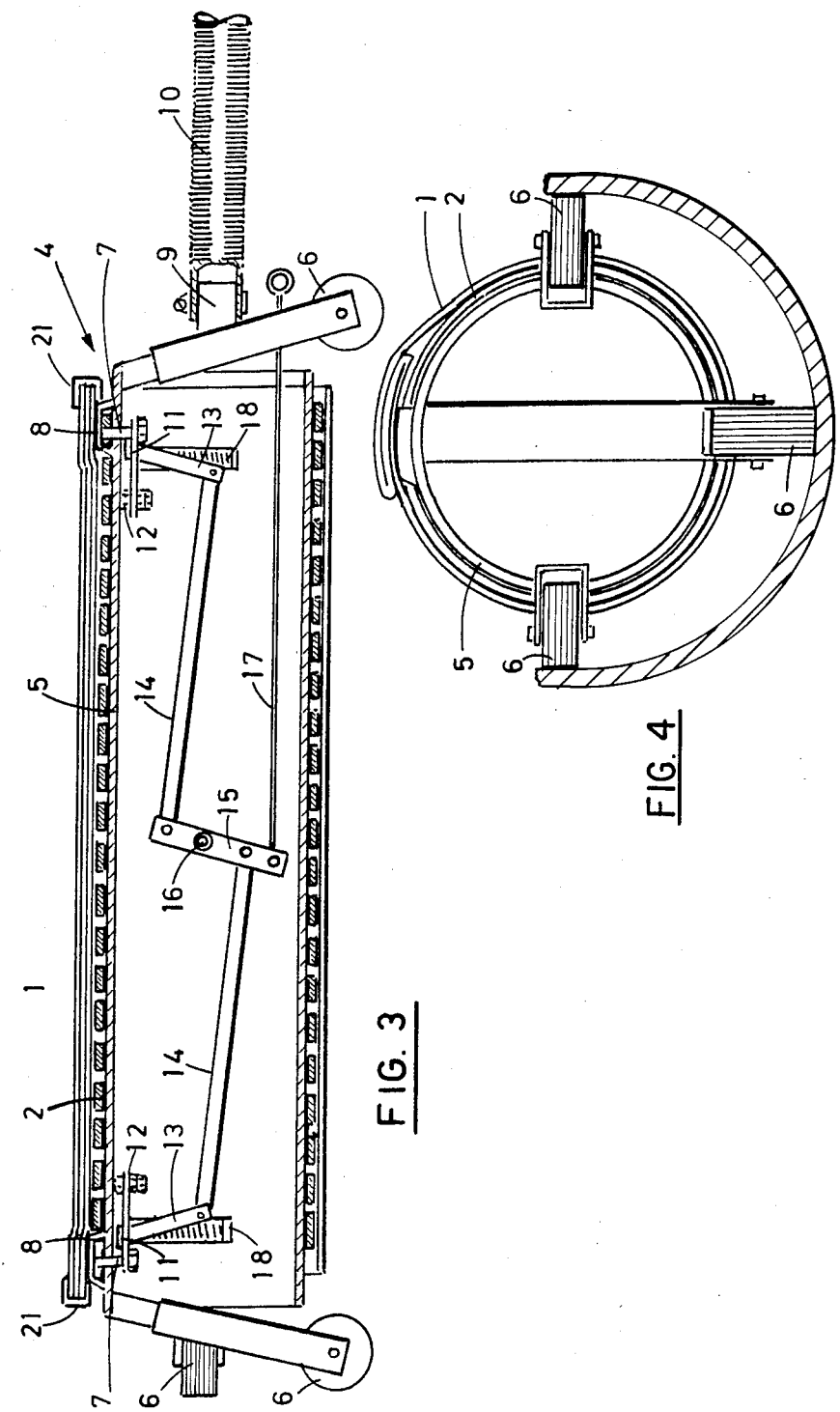

REPAIR SLEEVE FOR PIPING

BACKGROUND OF THE INVENTION

1. Field of the Invention

The present invention relates to equipment for repairing damage to piping at places with difficult access, e.g. damage to piping buried in the ground. More specifically, the invention refers to a repair sleeve which may be inserted in such piping from openings in access gullies and the like, and which readily and effectively forms a supplementary conduit part inside the piping covering the inner wall of the damaged place. The invention also includes an insertion device for such sleeves.

2. Description of the Related Art

It is quite often the case with wastewater pipes that due to settling they crack, and joints between pipes become leaky. The consequence is that wastewater leaks out and pollutes the surrounding ground. On the other hand, it also happens that ground water and rain water come into the pipes through the damaged areas which results in that the volume of wastewater increases. The latter problem is a very important one, since the unpolluted water finding its way into the pipe accompanies the wastewater to the sewage treatment plant, where it increases the amount of wastewater which must be treated. In turn, this can result in that the plant capacity is exceeded, and unsatisfactorily purified water will be released to the recipient. Even if the plant capacity is not exceeded there is still the cost of treating an unnecessary large volume of wastewater, a large proportion of which did not need to be treated.

There are also many cases where roots from trees and other vegetation in the vicinity of wastewater pipes are attracted towards leaks in it. This is because the ground there is damp and also rich in nutritive substances. Some of these roots find their way into the cracks or apertures in the pipes and cause them to become larger as the roots grow thicker and thicker. Not only that, but the roots in the pipes obstruct the staisfactory flow of wastewater through them, and can also result in total blockage.

Many solutions of the above-mentioned problems have been sought, but no previous solution has been regarded as fully viable. The usual method of repair is therefore still to excavate round the damage, at great expense and trouble, to uncover the pipe and carry out some form of repair, preferably such as replacing damaged section of pipe.

In the state of the art today, it is usual to examine such piping with the aid of a remotely controlled TV-type camera to determine the occurrance of damage, its extent and location. There is also conventional equipment for cutting off and removing roots in the pipe, all this work starting from the mouth of the piping in inspection wells, access gullies and the like.

It is not necessary to be skilled in the art to understand that if damage of the kind mentioned could be remedied from inside the piping without excavation, then large economic savings could be made. Furthermore, all the trouble caused in communications as a result of excavating streets and roads would be avoided.

One attempt to find a solution to the above-mentioned problems without too extensive excavation is the so-called relining technique, which is to insert inner tubes into existing pipes. From the material aspect this means costs which are substantially just as great as for laying new pipes. On the other hand, it is not necessary to dig up streets and roads, except at the places where pipelaying starts, i.e. preferably in connection with inspection wells and the like. Relining is not usually practised for repairing sporadically occurring damage, and it is primarily used for the prevention of damage to older piping, since the insertion of the inner tubes requires certain special measures, e.g. excavation, for their insertion.

SUMMARY OF THE INVENTION

The present invention relates to the insertion of a sleeve in the form of a flexible hose, the dimensions of which are suited to the dimensions of the piping in which it is to be used, and which can be biased by a spring into stable engagement against the interior wall of an outer pipe. The inventive concept also includes enabling the sleeve and spring to be taken up to the damaged place through the pipe, where the sleeve is urged outwards by the spring into engagement with the inner wall of the pipe with a force such that the water pressure, coming primarily on the outside of the sleeve does not press the sleeve inwardly away from engagement with the inner wall. Neither shall the resilient component of the sleeve have any inwardly projecting elements which can obstruct flow through the pipe so that there is a risk of building up a plug.

There is also included in the invention an insertion device on which the sleeve with its spring can be mounted for insertion in the tube, and from which the spring and sleeve can be released for pressing against the inside wall of the existing pipe. The insertion device can then be readily removed from the pipe without obstruction from the repair that has been made.

There are elements, sealing per se, in the form of short hoses of flexible material which are pressed outwards against the inner wall of a surrounding pipe with the aid of springs. These are primarily intended for use in sealing pipe joints, and are made for putting into place during pipelaying. In such cases the fitting of such sleeves does not present any great difficulty. They are furthermore intended for piping which carries gases or liquids at a given excess pressure, and therefore it is not necessary to take into account the problems which are present in wastewater or sewage systems, where an outer pressure acts on the sleeve, urging it inwardly in the pipe.

The repair sleeve according to the present invention is primarily intended for use in repairing wastewater pipes which are laid in the ground with difficult access, and where the only possibility of access to them is through cramped inspection wells and the like. Such piping is extremely dirty, even after flushing, although the solid content in the wastewater has been removed, and furthermore the atmosphere in the pipe is heavily corrosive. According to a known embodiment of a sealing sleeve with springs for urging the sleeve outwards, the outside of the sleeve is provided with adhesive material for ensuring that the sleeve will fasten onto the surrounding pipe wall. This is because one does not dare to rely entirely on the sealing action of the springs in this case. However, in a wastewater system such an adhesion technique would be technically impossible.

According to another known embodiment, the spring component of the sleeve may be biased with turnbuckles. This construction also demonstrates that one does not dare to rely entirely on effective sealing with the aid of the force from spring means. In this case it is necessary to crawl into the piping to get at such turnbuckles. Wastewater systems are however seldom large enough for crawling in, and it is doubtful whether someone could be found who will crawl in such piping in the environment to be found there.

As mentioned, the present invention has been developed to carry out repairs to wastewater pipes and to solve the special problems occurring with piping in wastewater systems. This means that the repair sleeve in accordance with the present invention has many uses, since it can also be used in conditions more favourable than those in wastewater systems. Compared with known devices of a similar kind, it may be used for both long and short repair distances, and it can be put in place a long way from the opening in piping which is not accessable from other than cramped inspection wells and the like.

The present invention thus aims at surmounting the problems mentioned in the introduction, giving at the same time a simple, cheap and rapid repair of practically unlimited durability.

This object is achieved by a repair sleeve and an insertion device for it that is in accordance with the accompanying claims, from which the distinguishing features of the invention will be perceived.

BRIEF DESCRIPTION OF THE DRAWINGS

The invention will now be described in detail in the following with reference to the accompanying drawings, in which FIG. 3 is a schematic longitudinal section through an insertion device in accordance with the invention, with a repair sleeve mounted on it for insertion into a pipe, FIG. 4 is an end view from the lefthand side of the device in FIG. 3, FIGS. 5 and 6 are partially sectioned views, to an enlarged scale, of the latching means for retaining and releasing the sleeve mounted on the insertion device.

DESCRIPTION OF THE PREFERRED EMBODIMENTS

The repair sleeve in accordance with the invention comprises a hose-like sleeve 1 enclosing a spiral spring 2. In a preferred embodiment, the spiral spring 2 comprises a strip of acid proof metal with a width of between 2 and 5 cm and a thickness of between 1 and 4 mm, the dimensions depending on the size of the pipe in which the sleeve is intended to be used. These dimensions are however in no way decisive for the invention, and in principle the spiral spring element may have any cross-sectional configuration.

Figure 1:
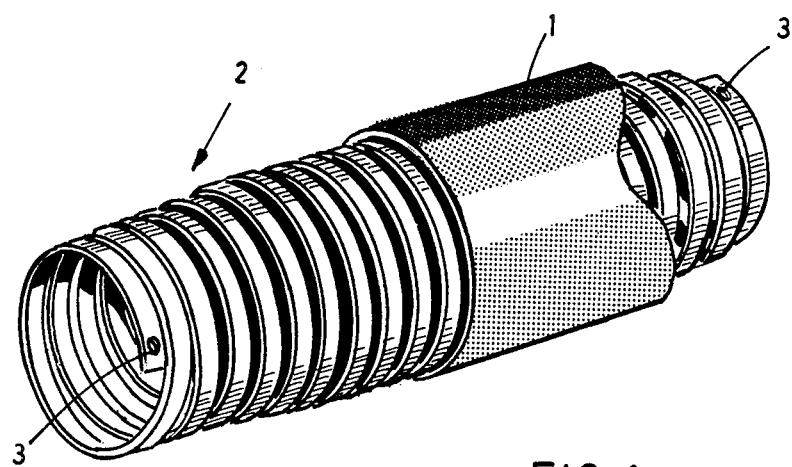
FIG. 1 is a perspective view of a spring intended for outwardly expanding a repair sleeve, as well as a portion of a sleeve placed round the spring.

As will be seen from FIG. 1, where the spring 2 is illustrated in a completely untensioned state, it has a largest diameter at its central portion while its diameter decreases towards the ends giving it a barrel shape. Similarly, the turns are wound with gaps in the central portion, while the gaps decrease towards the ends, to disappear entirely between the outmost turns. In certain embodiments, the turns of the spring strip may be inclined, seen in section, in relation to a central axis of the spring 2. Close to either free outer end of the spring there is a hole 3, which coacts with a retaining pin on the insertion device.

An insertion device 4 is illustrated in FIGS. 3 and 4, and comprises a tubular main part 5 provided with wheels 6 enabling the device to be moved along in a pipe. At either end of the main part 5 there is a hole in the tubular wall for a pin 7. Above either hole there is a cage or eye 8, through which the end of the spring strip is passed in connection with the spring 2 being arranged on the main part 5, the spring being placed so that the pins 7 can project through the holes 3 in the spring strip.

The insertion device 4 is provided at one end with an axially projecting, blanked off pipe stub 9, on which a hose 10 is attached. The hose 10 is suitably of a material such that it can be subjected to a gas or liquid pressure in the order of magnitude of 60–70 kp/cm$^2$ without bursting, while still having great flexibility when it is not pressurized.

Figure 5:
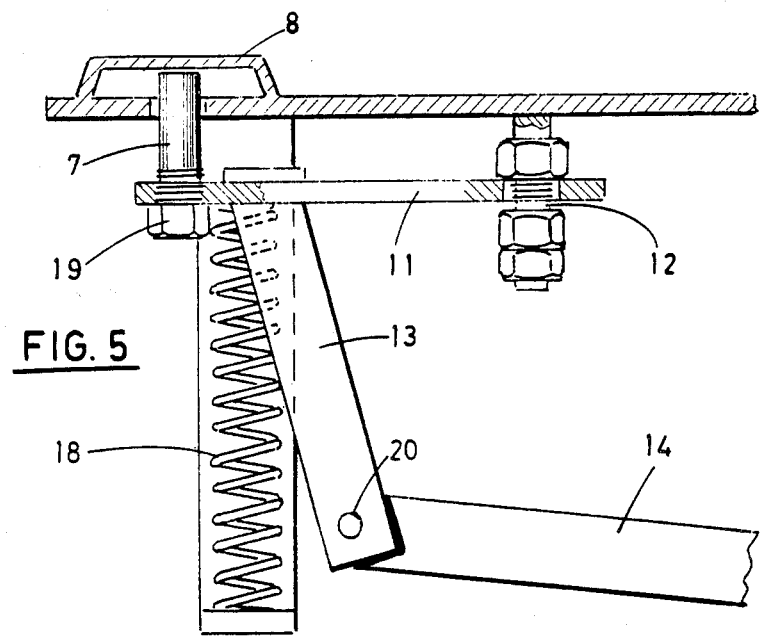
Figure 6:
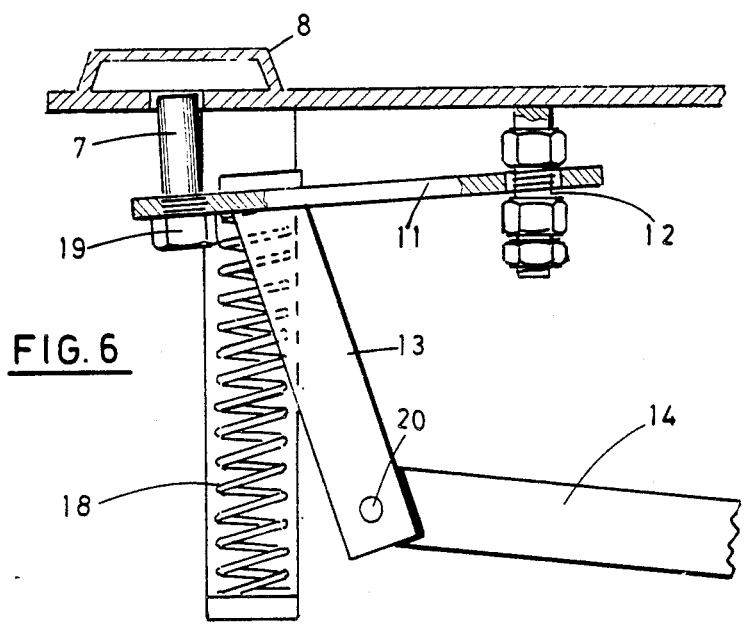

The configuration of the latching means, which is the same for both ends of the insertion device, will be seen from FIGS. 5 and 6. The pin 7 is attached to one end of an arm 11 such that its axial position may be adjsuted, in this case by one end of the pin being threaded and accommodated in a threaded hole in the arm 11. The thread on the end of the pin 7 is sufficient for screwing a lock nut 19 onto it. The other end of the arm 11 is pivotably mounted at 12. A helical spring 18 acts against the arm 11 to bias the pin outwards, the pin having a length sufficient to enable its free end to pass through the wall of the part 5 and the thickness of the spring 2.

A second arm 13 is suitably attached to the arm 11 for providing a downwardly directed force therein, the other end of the arm 13 being pivotably connected to a pullrod 14 via a joint 20. The other end of the pullrod 14 is connected to a lever 15, pivotable about a fulcrum pin 16. At the same distance on the other side of the fulcrum pin 16 there is a second pullrod 14 pivotably attached to the lever so that the identical latching means are actuated equally when the lever 15 is turned to pull the pins 7 out of the holes 3 to release the spring 2. The lever 15 is turned with the aid of a pullrod 17 pivotably connected to the lever at the lower end of the lever and provided with an eye at its other end.

The invention functions in the following manner:

The end of a strip blank for a spiral spring 2 is attached to the pin 7 by the pin being passed through the hole 3 in the strip end after the end has been taken into the cage 8. The strip blank is then wound round the tubular main part 5, a special tool being needed for this since the spring is of a very powerful type. At the final turn, the other end of the spring is taken into the other cage 8 and the pin 7 there is caused to pass into the hole 3. In this position the spring is heavily stressed and is kept in this state by the pins 7. To prevent accidents during the formation of the spring, an unillustrated hood can be arranged so that if the spring should slip it cannot whip out.

Figure 2:
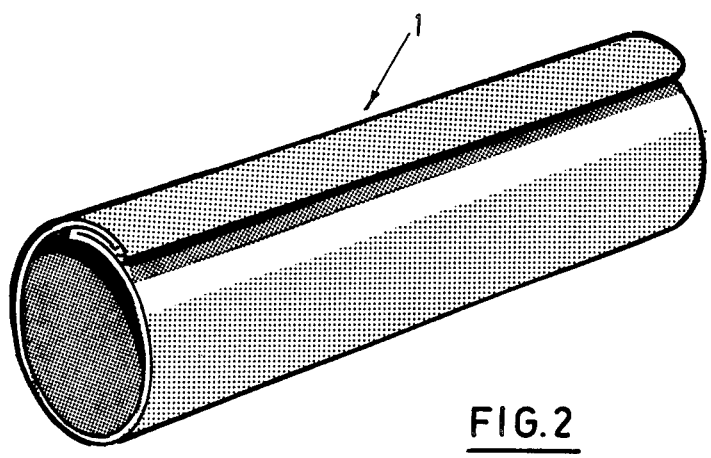
FIG. 2 illustrates a sleeve with its diameter reduced for insertion in a pipe.

A sleeve 1 is now placed outside the spring 2 and locked in place by clips 21, which simultaneously keep the sleeve in the circumferentially overlapping condition as illustrated in FIG. 2. The insertion device thus prepared may be seen in FIGS. 3 and 4.

Both the insertion device 4, spring 2 and sleeve 1 are adapted for a given pipe diameter, although the device 4 could be used for a limited range of pipe diameters. In its unbiased state, the spring 2 has a diameter at its outer ends which is approximately 10-20% greater than the pipe diameter, while the diameter of its central section is substantially greater.

Conventional techniques are used, as mentioned in the introduction, to determine the position of damage in a pipe as well as to prepare a repair by cleaning and flushing. After these measures have been taken, the insertion device 4 is thus manoeuvred into the pipe from the inspection well or the like nearest to the damage in the pipe. By the arrangement of the wheels 6 the insertion device is kept in substantially the position which may be seen in FIGS. 3 and 4. Compressed air is blown into the hose 10, and since the pipe stub 9 is blanked off, pressure will built up in the hose 10, making it stiff, apart from that transverse folds may be made in it with some exertion. This means that the hose 10 can be under pressure but folded in the inspection well, and the operator may then straighten out the hose bit by bit so that it functions as a bar, with the aid of which the insertion device can be pushed along the inside of the pipe.

When the insertion device 4 has come into a desired position in relation to the damage which is to be remedied, the device is kept still with the aid of the stiff hose 10. A cord attached to the eye of the rod 17 is then pulled, which causes the pins 7 to be withdrawn simultaneously, both ends of the spring 2 being released, the clips 21 also being pushed off.

Since the spring 2 has a barrel-shaped configuration, as seen in FIG. 1, the central portion of it will spring out first on being released and press out the central portion of the sleeve 1 against the inner wall of the surrounding pipe, the outward movement continuing axially out towards the ends of the spring 2. The sleeve 1 will thus be stretched both radially and axially, the risk of creases or folds thus being practically entirely excluded.

In its working state the spring 2 is somewhat longer than the sleeve 1, which results in that its ends project outside the sleeve 1 when the latter is forced against the pipe. The outer turns of the spring are juxtaposed and they will thus cover the ends of the sleeve 1, which are thus prevented from being drawn inwards, which is something which can otherwise easily happen.

The cross section of the spring blank used can be anything from round to rectangular. The strip material illustrated on the drawings has, however, the advantage that it gives a wide contact surface and few turns, whereas a spiral spring of the usual round wire would need many turns and only give a small contact surface. The large contact surface is important for withstanding exterior pressure, as is the case with defective wastewater piping. The turns are relatively close the whole time, and the water pressure coming from outside cannot press in the hose material in the gaps between the turns to any great extent, which could cause an obstacle to the flow.

As previously mentioned, the spring turns can be somewhat inclined in relation to the axis of the spring. Seen from the middle portion of the spring 2 and outwards towards the ends, each turn thus slopes inwards a small amount. In the illustrated embodiment of the invention, the hose 1 is about 90 cm long, and when the spring 2 is wound onto the insertion device 4 it is of the same length, which increases to 110 cm when the spring is released from the device. This means that as the spring 2 strives in the hose to reach its unstressed condition it will expand radially and axially. While the mentioned inclination, the turns of the spring move away from the middle portion of the hose outwards towards the ends, and simultaneously stretch the sleeve 1 into smooth engagement against the inner wall of the surrounding pipe. To ensure that this movement of the spring inside the sleeve 1 is done as smoothly as possible, the inside of the sleeve is coated with a low-friction material, or such a material has been applied by painting, spraying or in some other way on the spring 2 and/or on the inside of the sleeve before the latter is mounted on the spring on the insertion device 4.

In order to prevent new roots growing into the damage which has been repaired by a sleeve in accordance with the invention, the sleeve 1 may have an exterior coating of such as copper sulphate or some other substance inhibiting the growth of roots. The sleeve 1 may also have circumferential sealing rings of special material for special applications, but for the normal repair of wastewater pipes these are not justified, since the spring 2 gives sufficient contact pressure between the sleeve 1 and the inner wall of the surrounding pipe for satisfactory sealing to be achieved.

The repair sleeve in accordance with the present invention can also be used for relining, i.e. when certain pipe portions of greater length are inserted in deficient piping. It is namely not always easy to obtain a reliable seal between the existing pipe and the liner tube in a simple way. With the inventive repair sleeve, deviations in diameter between the two pipes are not critical, and a repair sleeve in accordance with the invention is excellent to use at the beginning and end of such liners, since it tolerates deviation both in roundness and diameter.

Figure 7:
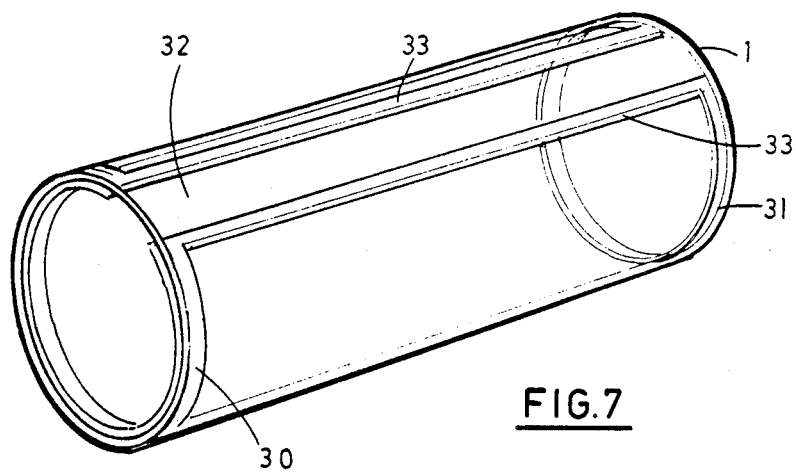
FIG. 7 is a schematic, transparent, perspective view of a second embodiment of the repair sleeve.

To ensure that the sleeve 1 does not become ensnared with the spring 2, the sleeve can be made as illustrated in FIG. 7. For the sake of clarity, the sleeve 1 is shown here as being "transparent", so that it may be seen how two substantially circular springs 30, 31, with a rectangular cross section, are attached to the inside of the sleeve 1, e.g. by vulcanizing, one at either end of the sleeve 1. These circular springs 30, 31 have less circumferential extension than the sleeve 1, so that between them there is formed an unsupported portion 32, which enables the long edge portions of the sleeve 1 to overlap, giving the configuration illustrated in FIG. 2. The free ends of the springs 30, 31 are joined by longitudinal stiff strips 33, which serve to stretch the sleeve 1 in a longitudinal direction.

This sleeve 1 is used in the same way as previously described. However, the insertion device 4 is then provided with a releasing sequence such that the sleeve 1 according to FIG. 7 is released first, so that this is allowed to expand against the inner wall of the pipe, thereafter the spiral spring 2 itself is released to urge the sleeve tightly against the inner wall of the surrounding pipe. The releasing and clamping movement of the sleeve can be accelerated and facilitated by compressed air being blown against its inside from unillustrated jets on the insertion device 4.

Figure 8:
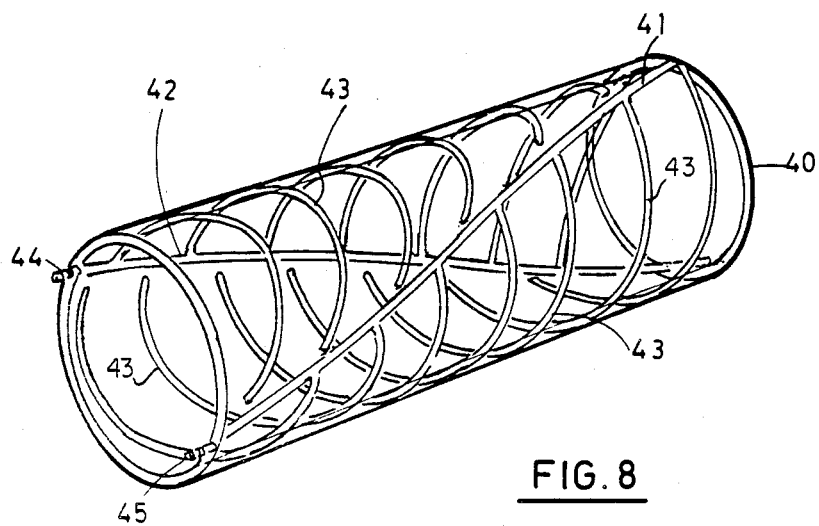
FIG. 8 is a schematic, transparent, perspective view of a third embodiment of the sleeve.

An alternative sleeve 40 is illustrated in FIG. 8, this sleeve being provided with air ducts 41, 42, 43, the sleeve being illustrated "transparently" so that these ducts may be seen. In the illustrated embodiment there are thus two longitudinal ducts 41, 42, which have axial extension but a small angle to a right axis. These ducts are provided with connections 44, 45 for compressed air, and a rib cage-like pattern of ducts 43 extending from the ducts 41, 42.

The sleeve 40 is also applied in the same way as previously described, and with the aid of the insertion device 4. The connections 44, 45 are connected to valves on the device 4, and when the sleeve 40 has come into the intended position in a pipe, compressed air is supplied to the connections 44, 45 and thereby to the ducts 41, 42, 43. As compressed air comes into these ducts, the sleeve 40 is pressed out against the surrounding inner wall of the pipe, both axially and radially. The spring 2 is then released to urge the sleeve 40 sealingly against the interior wall. The communicating means to the connections 44 and 45 from the insertion device are suitably broken off simultaneously as the spring 40 is released.

It will be understood that the sleeves according to FIGS. 7 and 8 may have different embodiments with respect to springs and air ducts, but the intention with these means is only to provide a pretensioning of the sleeve itself, and not to provide any permanent clamping of the sleeve, which is done with the aid of the previously described spring 2.

I claim:

1. A repair sleeve for insertion in and repair of a pipe comprising a flexible tubular member and a spiral spring positioned within said tubular member such that said tubular member circumferentially overlaps said spring, said spring being connectable to a stressing device for insertion into said pipe, said spring having a central portion and opposite first and second end portions and having a stressed condition and unstressed condition, said spring being disconnected from said stressing device in said unstressed condition, said spring being expandable radially and axially in said unstressed condition from said central portion towards said opposite first and second end portions, and said tubular member being correspondingly expandable radially and axially into engagement with an inner surface portion of said pipe by said spring in said unstressed condition, said central portion having a greater outer diameter than said opposite first and second end portions when said spring is in said unstressed condition.

2. Repair sleeve as claimed in claim 1, characterized in that the spring (2) is wound from a metal strip.

3. Repair sleeve as claimed in claim 2 wherein said strip is wound to provide a plurality of turns of said spring, each turn being inclined relative to an axis of said spring as said spring progresses from said central portion to said first and second end.

4. Repair sleeve as claimed in claim 1 wherein said flexible tubular member comprises means attached thereto for pretensioning said tubular member before said spring is in said unstressed condition.

5. Repair sleeve as claimed in claim 4, characterized in that the pretensioning means comprise circular springs (30, 31) of rectangular cross-section, which extend only partially around the interior circumference of the sleeve (1).

6. Repair sleeve as claimed in claim 4, characterized in that the pretensioning means comprise air ducts in the sleeve wall (41, 42, 43).

7. A device for inserting a repair sleeve into a pipe, the repair sleeve including a flexible, tubular member and a spiral spring positioned within said tubular member, comprising an elongated tubular body which is extended internal of said spiral spring from a first spring end to an opposite second spring end, said tubular body having one end adjacent said first spring end and another end adjacent said second spring end, a plurality of wheels extending radially outwards said tubular body to facilitate inserting said repair sleeve into said pipe and means coupled to said tubular body for stressing said spring in a first condition for insertion into said pipe and for unstressing said spring in a second condition so that said spring is released from said tubular body to urge said flexible, tubular member into engagement with an inner surface portion of said pipe.

8. Device as claimed in claim 7 including a high pressure hose attached at one end to the insertion device, the one end being blanked off so that said hose will be stiff when pressurized to function as a bar for pushing said device within said pipe, and flexible when not pressurized.

9. Device as claimed in claim 7 wherein each pin is operable by linkage system, the operation of said mutual linkage systems simultaneously actuating each pin.

10. Device as claimed in claim 8 wherein each pin is operable by a linkage system, the operation of said mutual linkage systems simultaneously actuating each pin.

11. Device for inserting a repair sleeve in a pipe or pipe line, said sleeve including a flexible, hose-like main part and a spring for urging the main part into engagement against an interior wall of the surrounding pipe, comprising a substantially tubular body with a latching means at either axial end for releasably fastening the spring about the tubular body, and wheels coupled to said tubular body carrying the insertion device for moving the insertion device in said pipe or pipe line, said latching means comprising a pin, spring biased radially outwards, which thrusts through the wall of the tubular body and through the spring end, and said device further including a cage placed in association with the pin for accommodating a spring end.

12. Device as claimed in claim 11 including a high pressure hose attached at one end to the insertion device, the one end being blanked off so that said hose will be stiff when pressurized to function as a bar for pushing said device within said pipe, and flexible when not pressurized .

13. Device as claimed in claim 11 wherein each pin is operable by a linkage system, the operation of said mutual linkage systems simultaneously actuating each pin.

* * * * *